US008363619B2

(12) United States Patent
Zhang et al.

(10) Patent No.: US 8,363,619 B2
(45) Date of Patent: Jan. 29, 2013

(54) METHOD, APPARATUS AND SYSTEM FOR ESTABLISHING S1 SIGNALING CONNECTION IN AN EVOLVED NETWORK

(75) Inventors: Hongzhuo Zhang, Shenzhen (CN); Yong Qiu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 594 days.

(21) Appl. No.: 12/466,628

(22) Filed: May 15, 2009

(65) Prior Publication Data
US 2009/0219890 A1 Sep. 3, 2009

Related U.S. Application Data

(63) Continuation of application No. PCT/CN2008/070210, filed on Jan. 29, 2008.

(30) Foreign Application Priority Data

Jan. 29, 2007 (CN) .......................... 2007 1 0002482

(51) Int. Cl.
H04W 4/00 (2009.01)
(52) U.S. Cl. ..................... 370/331; 370/431; 455/432.1; 455/436
(58) Field of Classification Search .................. None
See application file for complete search history.

(56) References Cited

U.S. PATENT DOCUMENTS

| 6,768,726 | B2 * | 7/2004 | Dorenbosch et al. | 370/331 |
|---|---|---|---|---|
| 6,850,503 | B2 * | 2/2005 | Dorenbosch et al. | 370/331 |
| 6,987,985 | B2 * | 1/2006 | Purkayastha et al. | 455/552.1 |
| 2006/0140159 | A1 | 6/2006 | Choi et al. | |
| 2006/0227746 | A1 * | 10/2006 | Kim et al. | 370/331 |
| 2008/0019320 | A1 * | 1/2008 | Phan et al. | 370/331 |
| 2008/0069049 | A1 * | 3/2008 | Olvera-Hernandez et al. | 370/331 |
| 2009/0129335 | A1 * | 5/2009 | Lee et al. | 370/331 |
| 2010/0189071 | A1 * | 7/2010 | Kitazoe | 370/331 |

FOREIGN PATENT DOCUMENTS

| CN | 1402949 A | 3/2003 |
|---|---|---|
| CN | 1499760 A | 5/2004 |
| CN | 1507190 A | 6/2004 |
| CN | 1794682 A | 6/2006 |
| CN | 1852586 A | 10/2006 |
| CN | 1859768 A | 11/2006 |
| CN | 101242296 A | 8/2008 |

(Continued)

OTHER PUBLICATIONS

Chinese Office Action dated Jun. 19, 2009, issued in related Chinese Application No. 200710002482.4, filed Jan. 29, 2007.

(Continued)

Primary Examiner — Hassan Kizou
Assistant Examiner — Roberta A Shand

(57) ABSTRACT

A method, apparatus and system for establishing S1 signaling connections in an evolved network are disclosed. A source evolved NodeB (eNodeB) sends a HANDOVER REQUEST message that carries original S1 signaling connection parameter information to a target eNodeB to initiate a process that a user equipment (UE) is handed over to the target eNodeB. When the UE enters the target cell, the target eNodeB allocates a new S1 signaling connection parameter and sends a HANDOVER COMPLETE message that carries the original S1 signaling connection parameter and the new S1 signaling connection parameter of the new eNodeB to an evolved packet core (EPC). The EPC receives the HANDOVER COMPLETE message that carries the new S1 signaling connection parameter and the original S1 signaling connection parameter. With the present disclosure, the inability of the target eNodeB to establish an S1 signaling connection with the EPC in the related art is effectively solved.

10 Claims, 9 Drawing Sheets

FOREIGN PATENT DOCUMENTS

| | | |
|---|---|---|
| CN | 101242354 A | 8/2008 |
| WO | 2004043024 A1 | 5/2004 |

OTHER PUBLICATIONS

Global System for Mobile Communications, "3$^{rd}$ Generation Partnership Project; Technical Specification Group Services and Systems Aspects; 3GPP System Architecture Evolution: Report on Technical Options and Conclusions (Release 7)." 3GPP TR 23.882 V1.6.1 (Nov. 2006) Technical Report, pp. 155-158.

International Search Report from P.R. China in International Application No. PCT/CN2008/070210 mailed May 8 2008.

Written Opinion of corresponding PCT Patent Application No. PCT/CN2008/070210, mailed on May 8,2008, 3pages total.

3GPP TR 23.882 V1.6.1: "3rd Generation Partnership Project; Technical Specification Group Services and System Aspects; 3GPP System Architecture Evolution: Report on Technical Options and Conclusions (Release 7)," dated Nov. 2006, 171 pages total.

3GPP TR 25.912 V7.1.0: "3rd Generation Partnership Project; Technical Specification Group Radio Access Network; Feasibility study for evolved Universal Terrestrial Radio Access (UTRA) and Universal Terrestrial Radio Access Network (UTRAN) (Release 7)," dated Sep. 2006, 57 pages total.

3GPP TR R3.018 V0.7.0: "3rd Generation Partnership Project; Technical Specification Group Radio Access Network; Evolved UTRA and UTRAN; Radio Access Architecture and Interfaces (Release 7)," dated Oct. 2006, 138 pages total.

Search Report of corresponding European Patent Application No. 08706587.6, Jan. 26, 2012, 7 pages total.

"3rd Generation Partnership Project; Technical Specification Group Radio Access Network; Evolved UTRA and UTRAN; Radio Access Architecture and Interfaces (Release 7)", 3GPP TR R3.018 V0.7.0, Dec. 14, 2006, XP050423655, 136 pages total.

Liu et al.: "689. Therapeutic Angiogenesis for Prefabrication of Ischemic Flaps with Multiple Growth Factor Gene Transfers: A Study in a Rat Model", Molecular Therapy, Academic Press, San Diego, CA, US, vol. 11, Aug. 15, 2005, p. 267, XP005016028, 1 page total.

Ericsson: "Updates to Intra-LTE handover in 36.300", 3GPP Draft; R3-061945, 3GPP TSG-RAN WG3 #54, Riga, Latvia, Nov. 13, 2006, XP050160823, 6 pages total.

\* cited by examiner

METHOD, APPARATUS AND SYSTEM FOR ESTABLISHING S1 SIGNALING CONNECTION IN AN EVOLVED NETWORK

This application is a continuation of International Patent Application No. PCT/CN2008/070210, filed on Jan. 29, 2008, titled "Method, Apparatus and System for Establishing S1 Signaling Connection in an Evolved Network", which claims the benefit of priority of Chinese Patent Application No. 200710002482.4, filed on Jan. 29, 2007, titled "Method, Apparatus and System for Establishing S1 Signaling Connection in an Evolved Network", the entire contents of all of which are incorporated herein by reference in their entireties.

FIELD OF THE INVENTION

The present disclosure relates to communication technologies, and in particular, to a method, apparatus and system for establishing S1 signaling connections in an evolved network.

BACKGROUND

In a system architecture evolution (SAE)/long term evolution (LTE) network, the S1 interface is an interface between an evolved universal terrestrial radio access network (eUTRAN) and a core network node (CN node). The CN node includes a mobility management entity (MME) and a user plane entity (UPE). The S1 interface is categorized into control plane interface (S1-CP) and user plane interface (S1-UP). The S1-CP is an interface between the eUTRAN and the MME (a control plane entity); the S1-UP is an interface between the eUTRAN and the UPE.

In the SAE/LTE network, between an evolved NodeB in the eUTRAN (eNodeB) and the MME, the logical connection between two S1-CP application part entities is called an S1 signaling connection, where the S1-CP application part is the S1 control plane interface application part protocol. In a current SAE/LTE network, the Stream Control Transmission Protocol (SCTP) is adopted as the transmission protocol for S1 interface control plane signaling. The S1-CP protocol stack is shown in FIG. 1.

As shown in FIG. 1, the evolved Radio Access Network Application Part protocol (eRANAP) entity is the S1-CP application part entity. To route application signaling over an SCTP transmission link correctly to the S1-CP application part entity, it is necessary that a one-to-one mapping should exist between transmission links and S1 signaling connections. Currently, mapping methods include the following two methods.

Method 1: Use the payload protocol identifier (PPI) field in the SCTP header to transmit identifier information of an S1 signaling connection in the following steps:
 1) When a non access stratum (NAS) signaling connection is established, the eNodeB or MME allocates an S1 signaling connection ID to each user equipment (UE). The S1 signaling connection ID may be allocated by the entity that initiates the NAS signaling connection. The S1 signaling connection ID is carried in the first NAS message over the S1 signaling connection and transmitted to the peer node. For example, the S1 signaling connection ID is included in an Initial UE Message of the S1 application layer signaling and transmitted by the eNodeB to the MME. The eNodeB and the MME must save the S1 signaling connection ID within the lifetime of the S1 signaling connection.
 2) The eNodeB and the MME respectively allocate communication instances for the new S1 signaling connection, which is uniquely identified by the SCTP association between the two ends, the SCTP stream, and the S1 signaling connection ID. 3) When the eRANAP communication entity of the eNodeB wants to send a message to the eRANAP communication entity of the MME, the eNodeB fills the S1 signaling connection ID in the PPI field of each SCTP data block and sends the message to the MME via the SCTP protocol.
 4) The MME routes the message correctly to the communication instance of the S1 signaling connection according to the PPI field in each SCTP data block.

Method 2: As shown in FIG. 2, respective communication context identifiers, that is, MME communication context identifier (e.g., AP MME/UPEcomm.id1, AP MME/UPEcomm.id2, AP MME/UPEcomm.idn, etc.) and eNB communication context identifier (e.g., AP eNBcomm.id1, AP eNBcomm.id2, AP eNBcomm.idn, etc.), are allocated to the eNodeB and the MME. The eNodeB or MME carries the corresponding communication context identifier in each application layer signaling message, and the peer application layer signaling entity routes the signaling message to the correct communication entity according to the communication context identifier.

During handover process, after a handover occurs, it is necessary to establish an S1 signaling connection between the target eNodeB and the evolved packet core (EPC) to connect the target eNodeB and the EPC.

SUMMARY

Embodiments of the invention provide a method, apparatus and system for establishing S1 signaling connections in an evolved network so as to solve the problem of the inability of a target evolved NodeB (eNodeB) to establish an S1 signaling connection with an evolved packet core (EPC) in the related art.

The embodiments of the invention are implemented through the following technical solutions.

A method for sending S1 signaling connection parameter information that includes sending, by a source eNodeB, a HANDOVER REQUEST message that carries S1 signaling connection parameter information to a target eNodeB to initiate a handover from a user equipment (UE) to the target eNodeB.

A method for establishing S1 signaling connections in an evolved network that includes receiving a HANDOVER REQUEST message that carries S1 signaling connection parameter information of a source eNodeB, allocating an S1 signaling connection parameter of a new eNodeB when a UE moves into a target cell, and sending a HANDOVER COMPLETE message that carries the S1 signaling connection parameter of the source eNodeB and the S1 signaling connection parameter of the target eNodeB to an EPC.

An eNodeB that includes an S1 signaling connection parameter allocating module, adapted to allocate an S1 signaling connection parameter of the eNodeB and an EPC to an UE; and a second module for sending S1 signaling connection identifier information that is adapted to send to the EPC a received S1 signaling connection parameter and the S1 signaling connection parameter allocated by the S1 signaling connection parameter allocating module.

A system for establishing S1 signaling connections in an evolved network that includes at least two eNodeBs, including a source eNodeB and a target eNodeB. The source eNodeB includes a first S1 signaling connection parameter sending module adapted to send an original S1 signaling connection parameter of a source eNodeB and an EPC to the target eNodeB. The target eNodeB includes an S1 signaling connection parameter allocating module adapted to allocate an S1 signaling connection parameter of the eNodeB and the EPC to the UE, and a second module for sending S1 signaling connection identifier information that is adapted to send to the EPC a received S1 signaling connection parameter of the source eNodeB and the EPC and the S1 signaling connection parameter of the target eNodeB and the EPC allocated by the S1 signaling connection parameter allocating module.

In the above technical solution provided by embodiments of the disclosure, an S1 signaling connection parameter, such as an S1 signaling connection ID or a communication context identifier, is added in messages during a handover process so that when a UE performs an intra-LTE handover, the target eNodeB may establish an S1 signaling connection with the EPC according to the S1 signaling connection parameter. This effectively addresses the inability of the target eNodeB to establish an S1 signaling connection with the EPC after a UE performs an intra-LTE handover in the related art.

DETAILED DESCRIPTION

Figure 1:
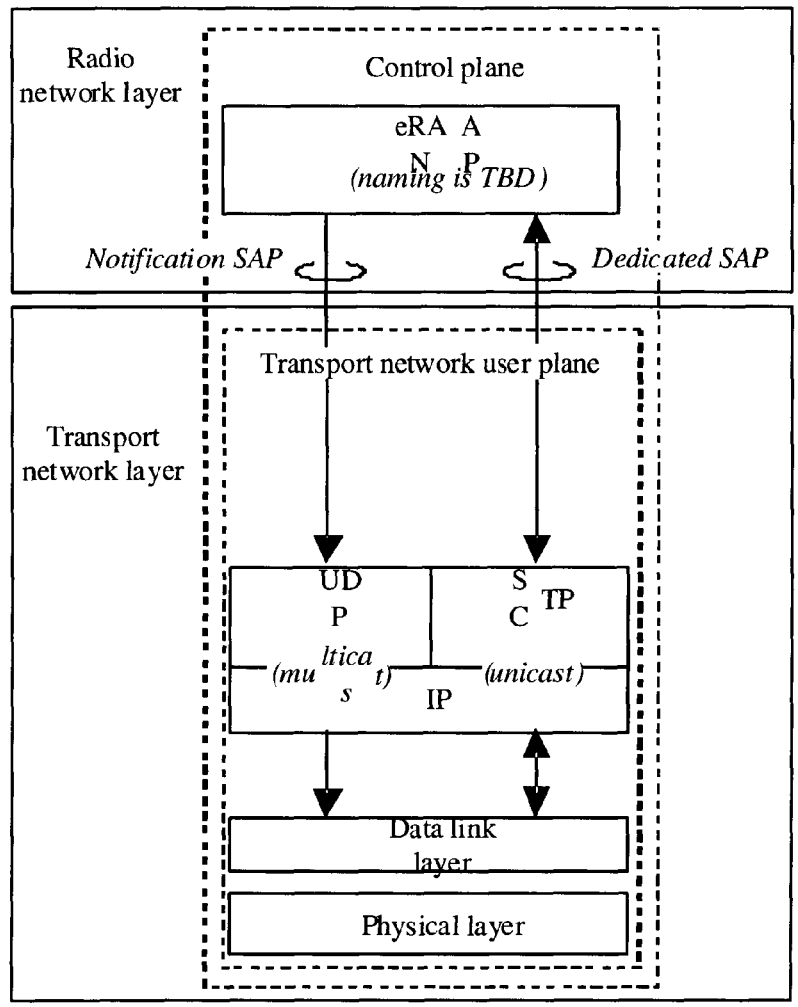
FIG. 1 shows the protocol stack structure of the S1-CP interface in the related art.
Figure 2:
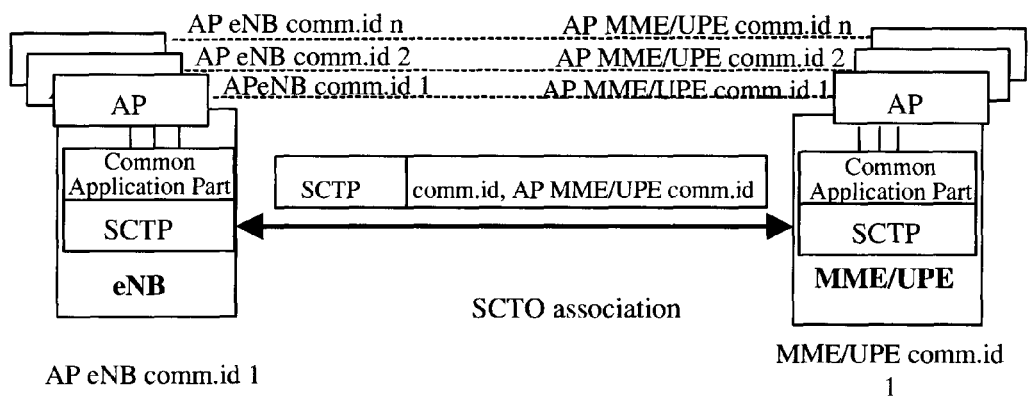
FIG. 2 shows the usage of communication context identifiers in the related art.
Figure 3:
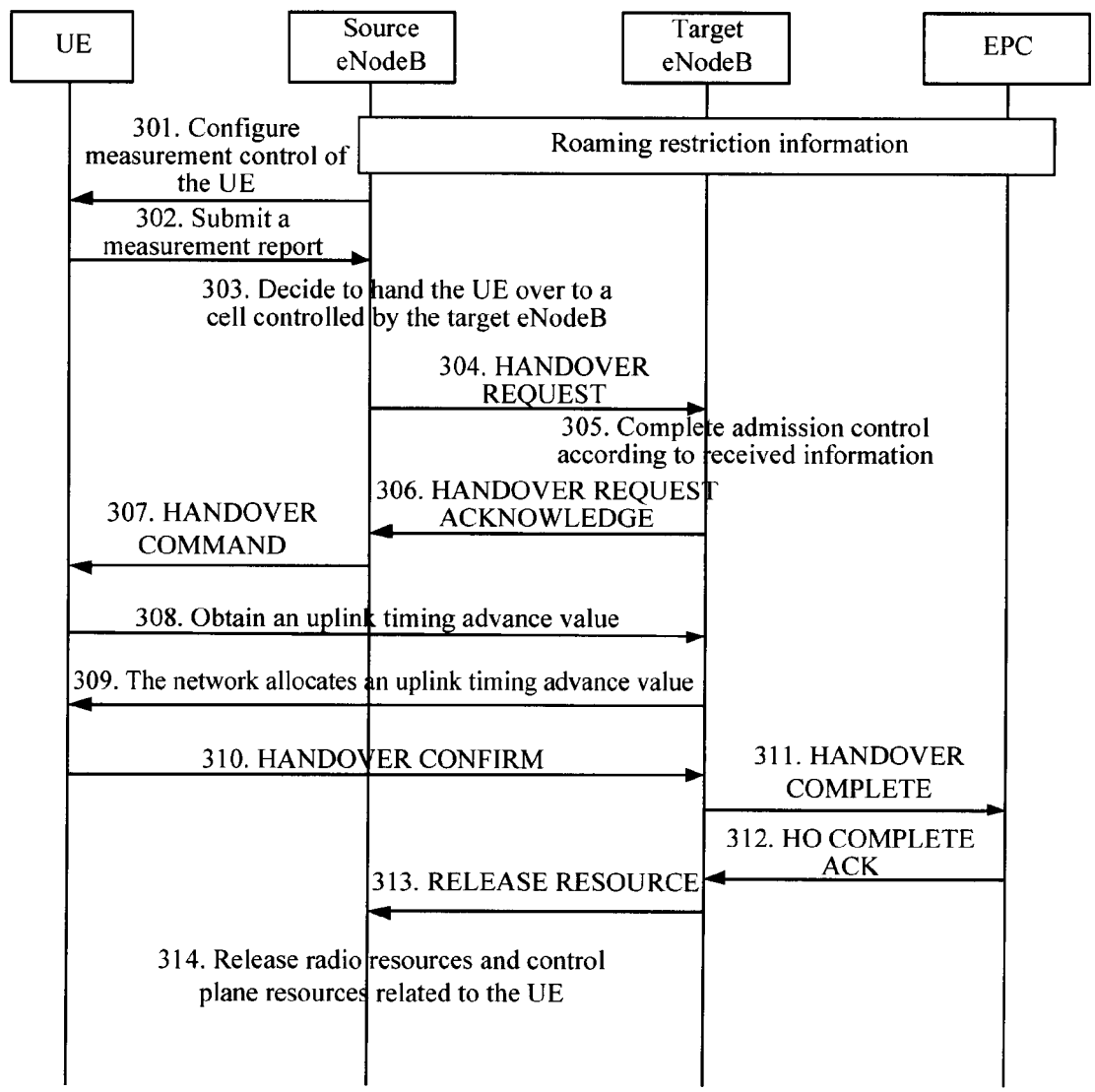
FIG. 3 shows a handover procedure in the related art.

An intra-LTE handover (HO) procedure in a current SAE/LTE network is shown in FIG. 3. The procedure includes the following steps.

Step 301: A UE context in a source eNodeB contains roaming restriction information, and the source eNodeB configures the measurement control process of the UE according to the roaming restriction information. The roaming restriction information is provided upon establishment of a connection or when the tracking area (TA) is last updated. The source eNodeB provides measurement information for the UE to help control the connection movement process of the UE.

Step 302: The UE triggers submission of a measurement report according to a specified rule. The UE may send the measurement report to the source eNodeB according to a certain specified rule, such as system information.

Step 303: When the UE needs a handover, the source eNodeB decides to hand the UE over to a cell controlled by the target eNodeB according to the measurement report sent by the UE and the radio resource management (RRM) information of the source eNodeB.

Step 304: The source eNodeB sends a HANDOVER REQUEST message to the target eNodeB. The message carries information required for handover preparation of the target eNodeB. The information includes X2 signaling context reference of the UE in the source eNodeB, signaling context reference of the UE in the evolved packet core (EPC) of the S1 interface, target cell ID, radio resource control (RRC) context, and SAE bearer context.

The target eNodeB addresses the source eNodeB and the EPC by using the S1/X2 signaling connection reference of the UE. The SAE bearer context includes: radio network layer and transport network layer address information required for handover preparation of the target eNodeB, quality of service (QoS) profile of the SAE bearer, and possible access layer configuration information. The target eNodeB configures the required resources.

Step 305: The target eNodeB completes admission control according to the received QoS profile of the SAE bearer so as to increase the possibility of successful handover.

If the target eNodeB is able to meet the resource requirement of the SAE bearer, the target eNodeB allocates appropriate resources according to the received QoS profile of the SAE bearer and, meanwhile, reserves a cell-radio network temporary identifier (C-RNTI).

Step 306: The target eNodeB sends a HANDOVER REQUEST ACKNOWLEDGE message to the source eNodeB. Upon reception of the HANDOVER REQUEST ACKNOWLEDGE message, the source eNodeB sends a HANDOVER COMMAND message to the UE and activates a start timer.

The HANDOVER REQUEST ACKNOWLEDGE message includes the newly allocated C-RNTI and other possible parameters, such as access parameter and radio network layer/transport network layer (RNL/TNL) information for establishing a forwarding tunnel. The HANDOVER COMMAND message includes the newly allocated C-RNTI, the possible start time, and system information block (SIB) of the target eNodeB.

Step 307: The UE receives the HANDOVER COMMAND from the source eNodeB and starts to execute the handover process.

Step 308: After the HANDOVER COMMAND start timer expires, the UE and the target eNodeB complete a synchronization process and obtain an uplink timing advance value.

Step 309: The network responds with an allocated uplink timing advance value.

Step 310: Once the UE accesses the target cell successfully, the UE sends a HANDOVER CONFIRM message to the target eNodeB, indicating completion of the handover. The target eNodeB confirms the message by checking whether the C-RNTI in the message is the one allocated by the target eNodeB itself.

Step 311: The target eNodeB sends a HANDOVER COMPLETE message to the EPC, notifying the EPC that the UE has changed to a new cell. The EPC hands the data route over to the target eNodeB and releases user plane and transport network layer resources related to the source eNodeB.

Step 312: The EPC sends a HO COMPLETE ACK message to the target eNodeB, confirming completion of the handover.

Step 313: The target eNodeB sends a RELEASE RESOURCE message to the source eNodeB to trigger the source eNodeB to release resources.

Step 314: Upon reception of the RELEASE RESOURCE message, the source eNodeB releases radio resources and control plane resources related to the UE context.

By carrying S1 signaling connection parameters, such as S1 signaling connection identifier information or communication context identifier information, in messages in the handover procedure, an embodiment of the disclosure implements the process of establishing a new S1 signaling connection between the target eNodeB and the EPC after the handover is complete.

One solution of the embodiments is described in the following paragraph.

Figure 4:
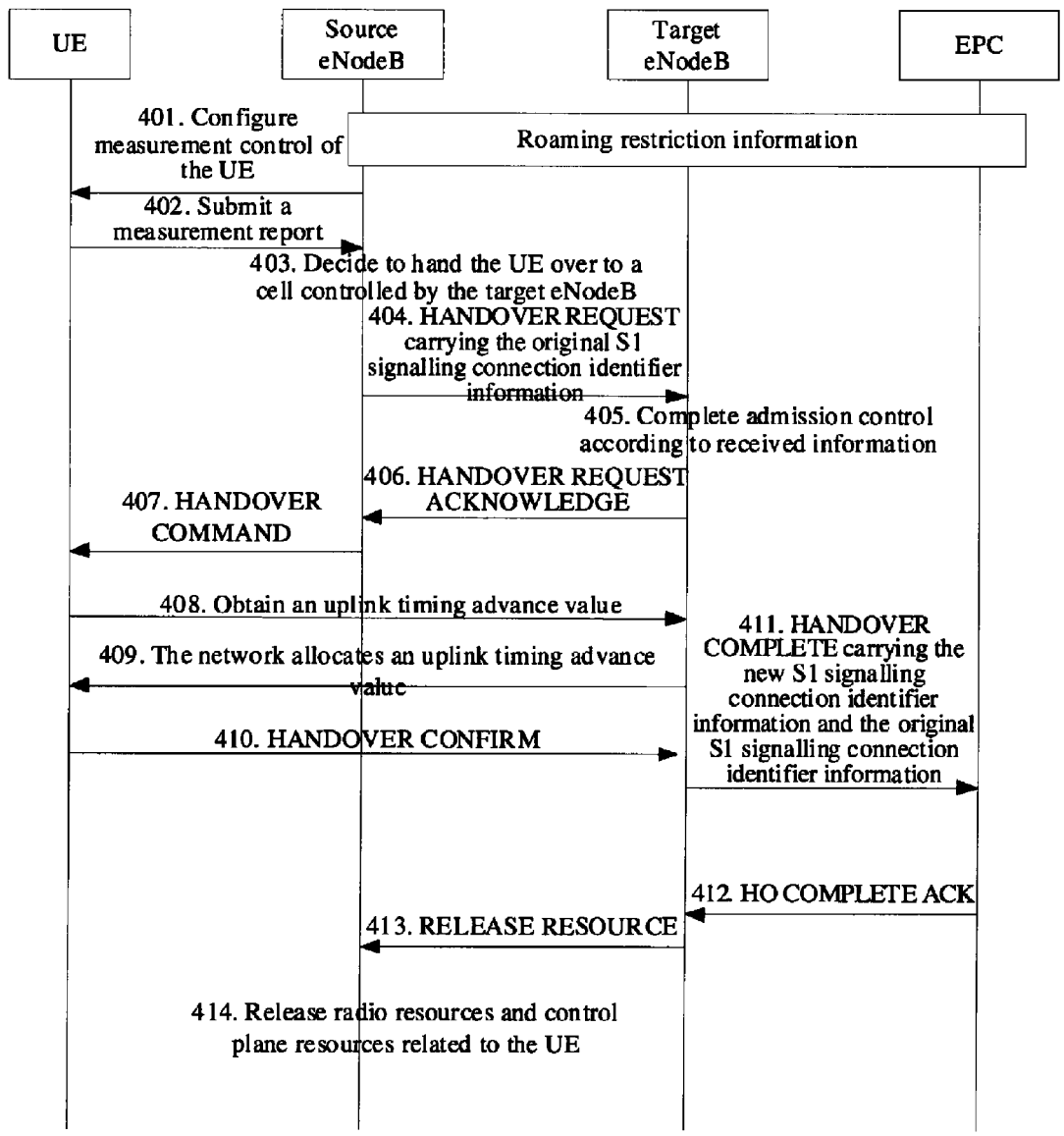
FIG. 4 shows the procedure of one implementation mode of the present disclosure.
Figure 5:
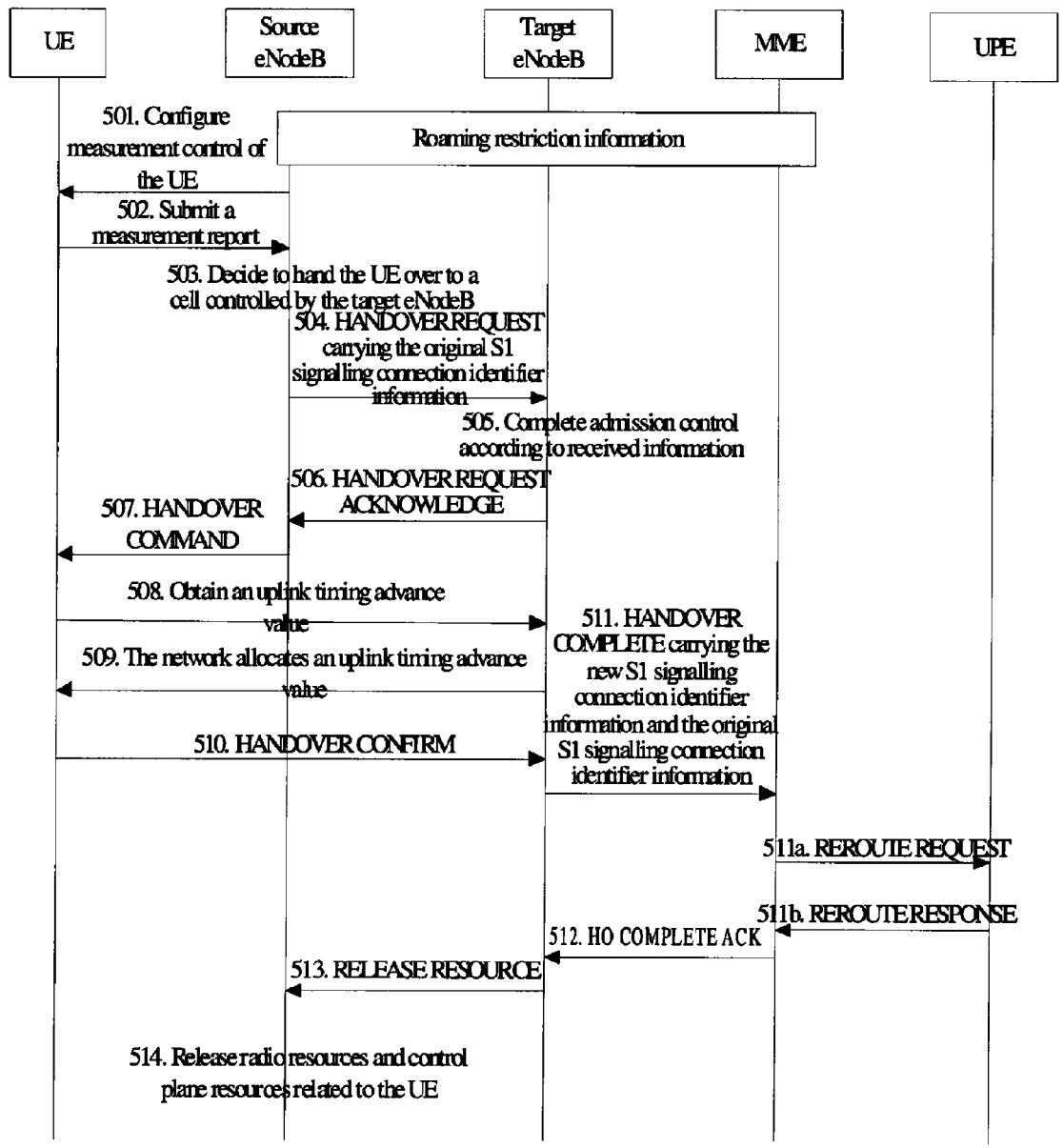
FIG. 5 shows the procedure of one implementation mode according to an embodiment of the present disclosure.

As shown in FIG. 4, in a prior handover procedure, current S1 signaling connection identifier information, namely original S1 signaling connection identifier information, is added in the HANDOVER REQUEST message sent by the source eNodeB to the target eNodeB. The current S1 signaling connection identifier information comprises an S1 signaling connection ID used by the source eNodeB and the EPC before handover, and, optionally, an SCTP association ID and an SCTP stream ID. The HANDOVER COMPLETE message sent by the target eNodeB to the EPC carries the original S1 signaling connection identifier information and the new S1 signaling connection ID, and the new S1 signaling connection identifier information is used in the SCTP message that carries the HANDOVER COMPLETE message. The new S1 signaling connection identifier information includes: SCTP association ID (optional), SCTP stream ID (optional) and S1 signaling connection ID.

After the target eNodeB sends the HANDOVER COMPLETE message to the EPC, the EPC receives the HANDOVER COMPLETE message. Before the EPC sends the HO COMPLETE ACK to the target eNodeB, the EPC creates a new communication instance and meanwhile stores the new S1 signaling connection identifier information carried in the HANDOVER COMPLETE message. The EPC searches for the original communication instance according to the original S1 signaling connection identifier information. Thus, an S1 signaling connection can be established between the target eNodeB and the EPC.

The following describes specific implementation procedures of the above implementation in detail with reference to the accompanying drawings.

Step 501: A UE context in a source eNodeB contains roaming restriction information, and the source eNodeB configures the measurement control process of the UE according to the roaming restriction information. The roaming restriction information is provided upon establishment of a connection or when the TA is last updated. The source eNodeB provides measurement information for the UE to help control the connection movement process of the UE.

Step 502: The UE triggers submission of a measurement report according to a specified rule. The UE may send the measurement report to the source eNodeB according to a certain specified rule, such as system information.

Step 503: When the UE needs a handover, the source eNodeB decides to hand the UE over to a cell controlled by the target eNodeB according to the measurement report sent by the UE and the RRM information of the source eNodeB.

Step 504: The source eNodeB sends a HANDOVER REQUEST message to the target eNodeB. The message carries information required for handover preparation of the target eNodeB. The information includes: X2 signaling context reference of the UE in the source eNodeB, signaling context reference of the UE in the EPC of the S1 interface, target cell ID, RRC context, SAE bearer context, and original S1 signaling connection identifier information. The original S1 signaling connection identifier information includes: S1 signaling connection ID used by the source eNodeB and the EPC before handover and, optionally, SCTP association ID and SCTP stream ID.

The target eNodeB addresses the source eNodeB and the EPC by using the S1/X2 signaling connection reference of the UE. The SAE bearer context includes: radio network layer and transport network layer address information required for handover preparation of the target eNodeB, QoS profile of the SAE bearer, and possible access layer configuration information. The target eNodeB configures the required resources.

Step 505: The target eNodeB completes admission control according to the received QoS profile of the SAE bearer so as to increase the possibility of successful handover. If the target eNodeB is able to meet the resource requirement of the SAE bearer, the target eNodeB allocates appropriate resources according to the received QoS profile of the SAE bearer and, meanwhile, reserves a C-RNTI.

Step 506: The target eNodeB sends a HANDOVER REQUEST ACKNOWLEDGE message to the source eNodeB. Upon reception of the HANDOVER REQUEST ACKNOWLEDGE message, the source eNodeB sends a HANDOVER COMMAND message to the UE and activates a start timer. The HANDOVER REQUEST ACKNOWLEDGE message includes the newly allocated C-RNTI and other possible parameters, such as access parameter and RNUTNL information for establishing a forwarding tunnel. The HANDOVER COMMAND message includes the newly allocated C-RNTI, the possible start time, and SIB of the target eNodeB.

Step 507: The UE receives the HANDOVER COMMAND from the source eNodeB and starts to execute the handover process.

Step 508: After the HANDOVER COMMAND start timer expires, the UE and the target eNodeB complete a synchronization process and obtain an uplink timing advance value.

Step 509: The network responds with an allocated uplink timing advance value.

Step 510: Once the UE accesses the target cell successfully, the UE sends a HANDOVER CONFIRM message to the target eNodeB, indicating completion of the handover. The target eNodeB confirms the message by checking whether the C-RNTI in the message is the one allocated by the target eNodeB itself.

Step 511: The target eNodeB sends a HANDOVER COMPLETE message to the MME, notifying the MME that the UE has changed to a new cell and an S1 signaling connection is established. The MME is an entity in the EPC, responsible for mobility management of the control plane, including user context and mobility state management and allocation of temporary identifiers. The target eNodeB allocates new S1 signaling connection identifier information, which includes an S1 signaling connection ID, and optionally, an SCTP association ID and an SCTP stream ID. The target eNodeB carries the new S1 signaling connection identifier information and the original S1 signaling connection identifier information in the HANDOVER COMPLETE message. The UPE hands the data route over to the target eNodeB and releases user plane and transport network layer resources related to the source eNodeB. Located in the EPC, the UPE is an entity which initiates paging for downlink data in the idle state, and manages Internet Protocol (IP) bearer parameters and intra-network routing information.

The above process may further comprise the following process:

Upon reception of the HANDOVER COMPLETE message, the MME creates a new communication instance and stores the new S1 signaling connection identifier information carried in the HANDOVER COMPLETE message. The MME searches for the original communication instance according to the original S1 signaling connection identifier information. This step is optional and not marked in the figure.

Step 511*a*: The MME sends a REROUTE REQUEST message to the UPE, requesting the UPE to update the user plane route.

Step 511*b*: The UPE sends a REROUTE RESPONSE message to the MME, indicating that the user plane route update is complete.

Step 512: The EPC sends a HO COMPLETE ACK message to the target eNodeB, confirming completion of the handover.

Step 513: The target eNodeB sends a RELEASE RESOURCE message to the source eNodeB to trigger the source eNodeB to release resources.

Step 514: Upon reception of the RELEASE RESOURCE message, the source eNodeB releases radio resources and control plane resources related to the UE context.

In the above embodiment of the disclosure, in a handover process, the original S1 signaling connection identifier information is carried in the HANDOVER REQUEST and the new S1 signaling connection identifier information allocated by the target eNodeB and the original signaling connection identifier information are carried in the HANDOVER COMPLETE message, so that an S1 signaling connection is established between the EPC and the target eNodeB according to the original signaling connection identifier information and the new signaling connection identifier information after the UE is handed over to the target cell.

Figure 6:
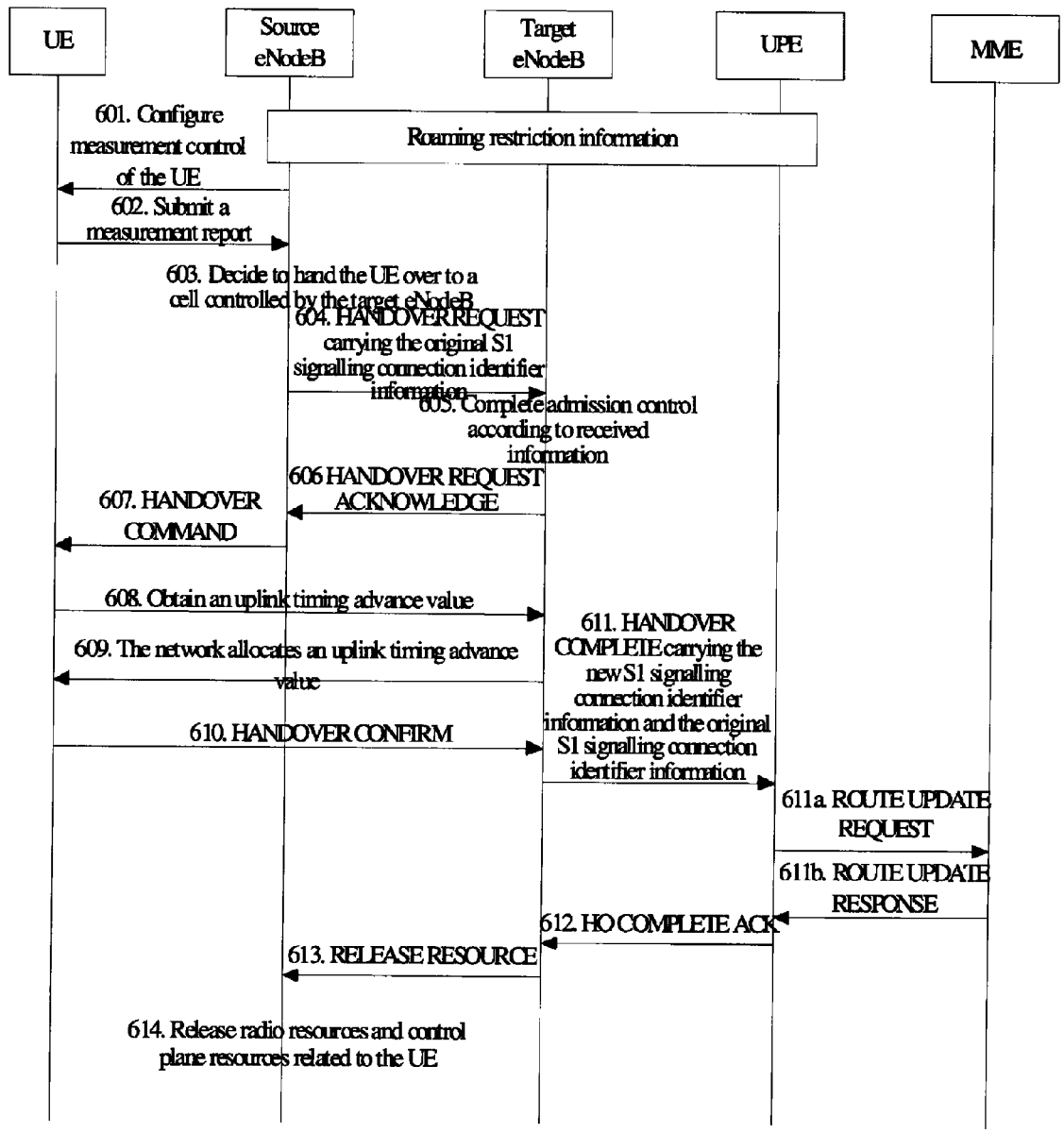
FIG. 6 shows the procedure of the one implementation mode according to another embodiment of the present disclosure.

Another embodiment of the disclosure is shown in FIG. 6. This embodiment is different from the previous embodiment in step 611, which includes the following:

the target eNodeB sends a HANDOVER COMPLETE message to the UPE, notifying the UPE that the UE has changed to a new cell and an S1 signaling connection is established; wherein the UPE located in the EPC is an entity which initiates paging for downlink data in the idle state and manages IP bearer parameters and intra-network routing information;

the target eNodeB allocates new S1 signaling connection identifier information, which includes an S1 signaling connection ID, and optionally, an SCTP association ID and an SCTP stream ID;

the target eNodeB carries the new S1 signaling connection identifier information and the original S1 signaling connection identifier information in the HANDOVER COMPLETE message;

the UPE hands the data route over to the target eNodeB and releases user plane and transport network layer resources related to the source eNodeB.

The above embodiment further includes the following steps.

Step 611*a*: Upon reception of the HANDOVER COMPLETE message, the UPE sends a ROUTE UPDATE REQUEST to the MME, notifying the MME that the user plane route is updated. The message carries the new S1 signaling connection identifier information and the original S1 signaling connection identifier information.

Upon reception of the HANDOVER COMPLETE message, the MME creates a new communication instance and stores the new S1 signaling connection identifier information carried in the ROUTE UPDATE REQUEST message. The MME searches for the original communication instance according to the original S1 signaling connection identifier information. This step is optional and not marked in the figure.

Step 611*b*: The MME sends a ROUTE UPDATE RESPONSE message to the UPE.

Other steps are the same as those in the previous embodiment.

The solution of another implementation mode of the disclosure is as follows.

Figure 7:
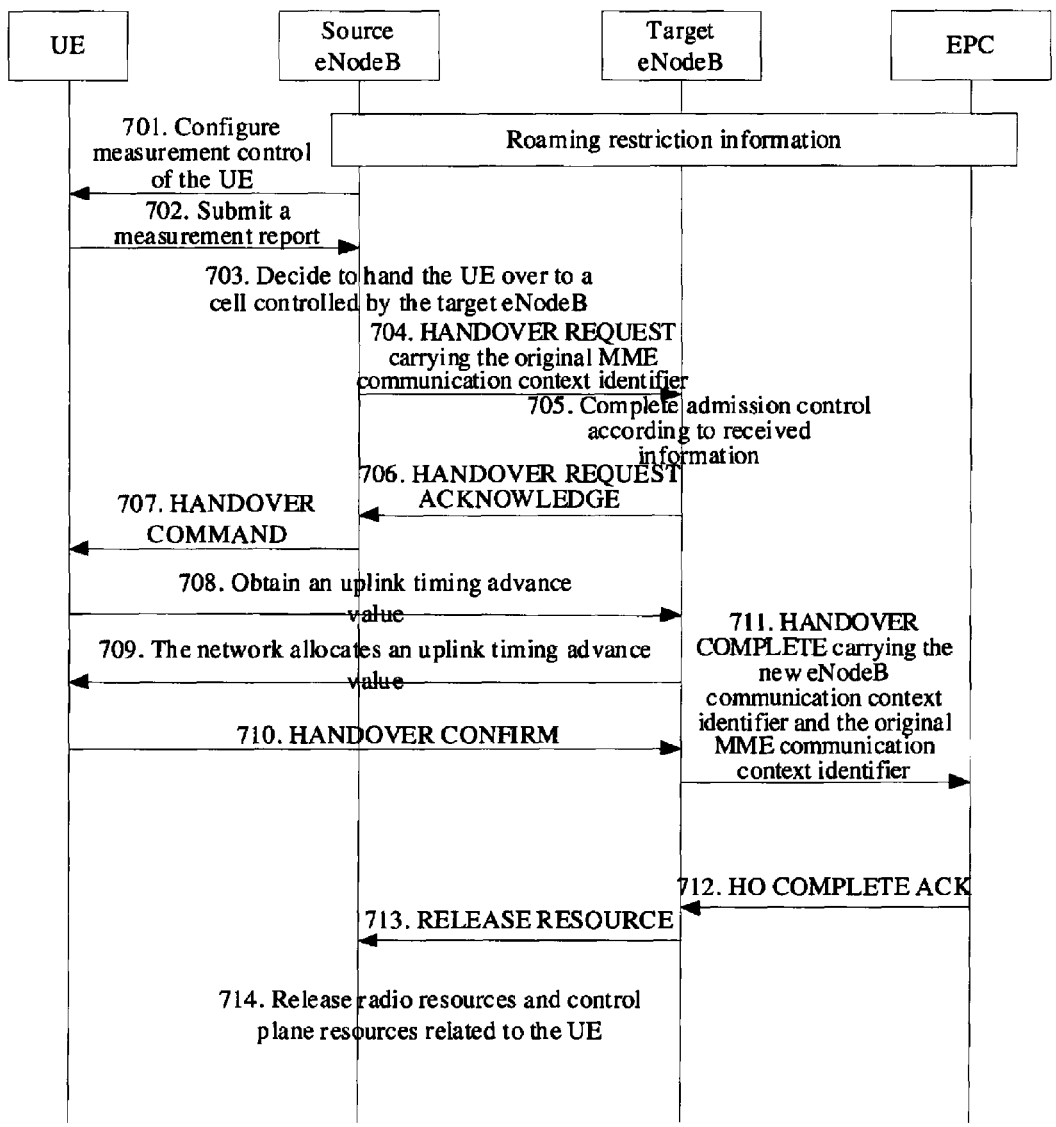
FIG. 7 shows the procedure of another implementation mode of the present disclosure.

As shown in FIG. 7, in the prior handover procedure, an original MME communication context identifier and, optionally, an eNodeB communication context identifier, are added in the HANDOVER REQUEST sent from the source eNodeB to the target eNodeB. The target eNodeB allocates a new eNodeB communication context identifier. The original MME communication context identifier and the new eNodeB communication context identifier and, optionally, the original eNodeB communication context identifier, are carried in the HANDOVER COMPLETE message sent by the target eNodeB to the EPC. After the target eNodeB sends the HANDOVER COMPLETE message to the EPC and the EPC receives the HANDOVER COMPLETE message, before the EPC sends a HO COMPLETE ACK message to the target eNodeB, the EPC creates a new communication instance and meanwhile stores the new eNodeB communication context identifier carried in the HANDOVER COMPLETE message. The EPC searches for the original communication instance according to the original MME communication context identifier. The EPC allocates a new MME communication context identifier and sends a HANDOVER COMPLETE ACK message carrying the new MME communication context identifier to the target eNodeB.

Figure 8:
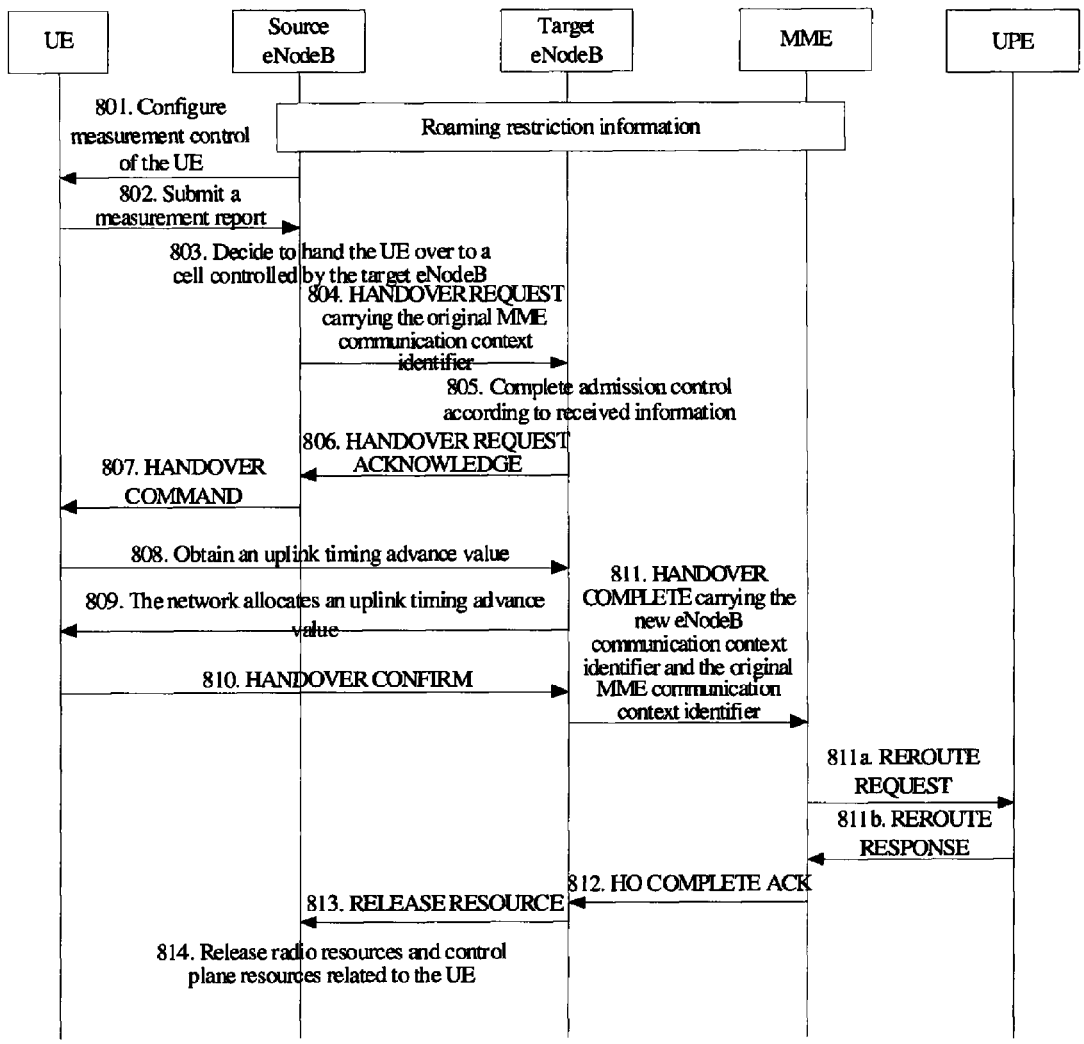
FIG. 8 shows the procedure of another implementation mode according to an embodiment of the present disclosure.

One embodiment of the above implementation mode is shown in FIG. 8, including the following steps.

Step 801: A UE context in a source eNodeB contains roaming restriction information and the source eNodeB configures the measurement control process of the UE according to the roaming restriction information. The roaming restriction information is provided upon establishment of a connection or when the TA is last updated. The source eNodeB provides measurement information for the UE to help control the connection movement process of the UE.

Step 802: The UE triggers submission of a measurement report according to a specified rule. The UE may send the measurement report to the source eNodeB according to a certain specified rule, such as system information.

Step 803: When the UE needs a handover, the source eNodeB decides to hand the UE over to a cell controlled by the target eNodeB according to the measurement report sent by the UE and the RRM information of the source eNodeB.

Step 804: The source eNodeB sends a HANDOVER REQUEST message to the target eNodeB. The message carries information required for handover preparation of the target eNodeB. The information includes: X2 signaling context reference of the UE in the source eNodeB, signaling context reference of the UE in the EPC of the S1 interface, target cell ID, RRC context, SAE bearer context, and original MME communication context identifier, and, optionally, original eNodeB communication context identifier.

The target eNodeB addresses the source eNodeB and the EPC by using the S1/X2 signaling connection reference of the UE. The SAE bearer context includes: radio network layer and transport network layer address information required for handover preparation of the target eNodeB, QoS profile of the SAE bearer, and possible access layer configuration information. The target eNodeB configures the required resources.

Step 805: The target eNodeB completes admission control according to the received QoS profile of the SAE bearer so as to increase the possibility of successful handover. If the target eNodeB is able to meet the resource requirement of the SAE bearer, the target eNodeB allocates appropriate resources according to the received QoS profile of the SAE bearer and, meanwhile, reserves a C-RNTI.

Step 806: The target eNodeB sends a HANDOVER REQUEST ACKNOWLEDGE message to the source eNodeB. Upon reception of the HANDOVER REQUEST ACKNOWLEDGE message, the source eNodeB sends a HANDOVER COMMAND message to the UE and activates a start timer. The HANDOVER REQUEST ACKNOWLEDGE message includes the newly allocated C-RNTI and other possible parameters, such as access parameter and RNL/TNL information for establishing a forwarding tunnel. The HANDOVER COMMAND message includes the newly allocated C-RNTI, the possible start time, and SIB of the target eNodeB.

Step 807: The UE receives the HANDOVER COMMAND from the source eNodeB and starts to execute the handover process.

Step 808: After the HANDOVER COMMAND start timer expires, the UE and the target eNodeB complete a synchronization process and obtain an uplink timing advance value.

Step 809: The network responds with an allocated uplink timing advance value.

Step 810: Once the UE accesses the target cell successfully, the UE sends a HANDOVER CONFIRM message to the target eNodeB, indicating completion of the handover. The target eNodeB confirms the message by checking whether the C-RNTI in the message is the one allocated by the target eNodeB itself.

Step 811: The target eNodeB sends a HANDOVER COMPLETE message to the MME, notifying the MME that the UE has changed to a new cell and an S1 signaling connection is established. The target eNodeB allocates a new eNodeB communication context identifier. The original MME communication context identifier and the new eNodeB communication context identifier and, optionally, the original eNodeB communication context identifier, are carried in the HANDOVER COMPLETE message. The UPE hands the data route over to the target eNodeB, and releases user plane and transport network layer resources related to the source eNodeB.

The above process further includes the following steps:

Upon reception of the HANDOVER COMPLETE message, the MME creates a new communication instance and stores the new eNodeB communication context identifier carried in the HANDOVER COMPLETE message. The MME searches for the original communication instance according to the original MME communication context identifier. This step is optional and not marked in the figure.

Step 811a: The MME sends a REROUTE REQUEST message to the UPE, requesting the UPE to update the user plane route.

Step 811b: The UPE sends a REROUTE RESPONSE message to the MME, indicating that the user plane route update is complete.

Step 812: The EPC sends a HO COMPLETE ACK message to the target eNodeB, confirming completion of the handover. Optionally, the MME may allocate a new MME communication context identifier and carry the new MME communication context identifier in the HO COMPLETE ACK message.

Step 813: The target eNodeB sends a RELEASE RESOURCE message to the source eNodeB to trigger the source eNodeB to release resources.

Step 814: Upon reception of the RELEASE RESOURCE message, the source eNodeB releases radio resources and control plane resources related to the UE context.

By carrying the original MME communication context identifier in the HANDOVER REQUEST message and carrying the new communication context identifier allocated by the target eNodeB and the original MME communication context identifier in the HANDOVER COMPLETE message, the foregoing embodiment establishes an S1 signaling connection between the EPC and the target cell according to the original S1 signaling connection identifier information and the new S1 signaling connection identifier information after the UE is handed over to the target cell.

Figure 9:
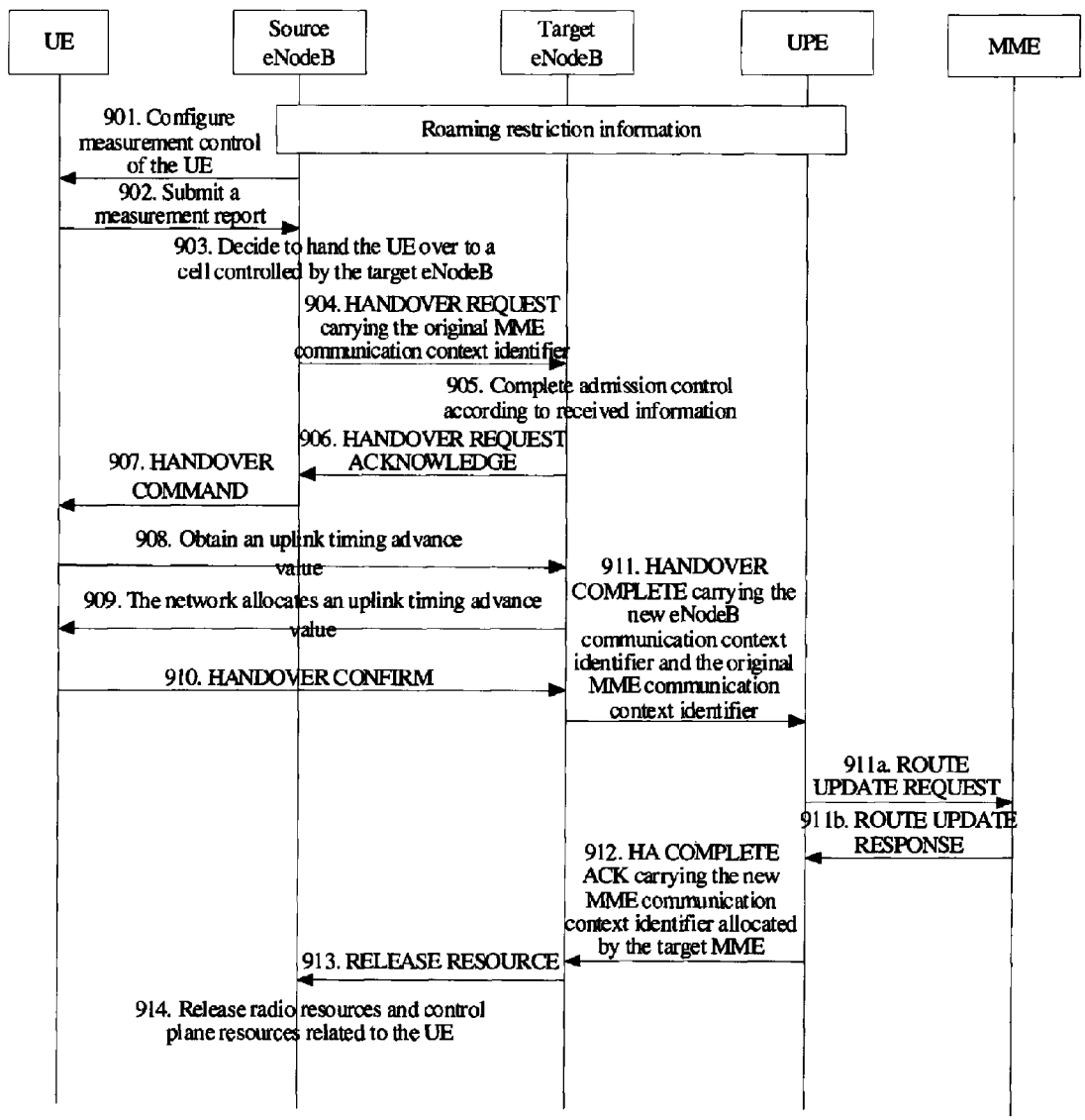
FIG. 9 shows the procedure of another implementation mode according to another embodiment of the present disclosure.

Another embodiment of the above implementation mode of the disclosure is shown in FIG. 9. This embodiment is different from the previous embodiment in step 911, which includes:

Step 911: The target eNodeB sends a HANDOVER COMPLETE message to the UPE, notifying the UPE that the UE has changed to a new cell and an S1 signaling connection is established. The target eNodeB allocates a new eNodeB communication context identifier. The original MME communication context identifier and the new eNodeB communication context identifier and, optionally, the original eNodeB communication context identifier, are carried in the HANDOVER COMPLETE message. The UPE hands the data route over to the target eNodeB and releases user plane and transport network layer resources related to the source eNodeB.

The above process further includes the following steps:

Step 911a: Upon reception of the HANDOVER COMPLETE message, the UPE sends a ROUTE UPDATE REQUEST to the MME, notifying the MME that the user plane route is updated. The message carries the original MME communication context identifier and the new eNodeB communication context identifier.

Upon reception of the ROUTE UPDATE REQUEST message, the MME creates a new communication instance and stores the new eNodeB communication context identifier carried in the ROUTE UPDATE REQUEST message. The MME searches for the original communication instance according to the original MME communication context identifier. This step is optional and not marked in the figure.

Step 911b: The MME allocates a new MME communication context identifier and sends a ROUTE UPDATE RESPONSE message that carries the newly allocated MME communication context identifier to the UPE.

Step 912: The UPE sends a HO COMPLETE ACK message to the target eNodeB, confirming completion of the handover. Optionally, the HO COMPLETE ACK message may carry the newly allocated MME communication context identifier. Other steps in this embodiment are the same as those in the previous embodiment of the above-mentioned implementation mode.

Figure 10:
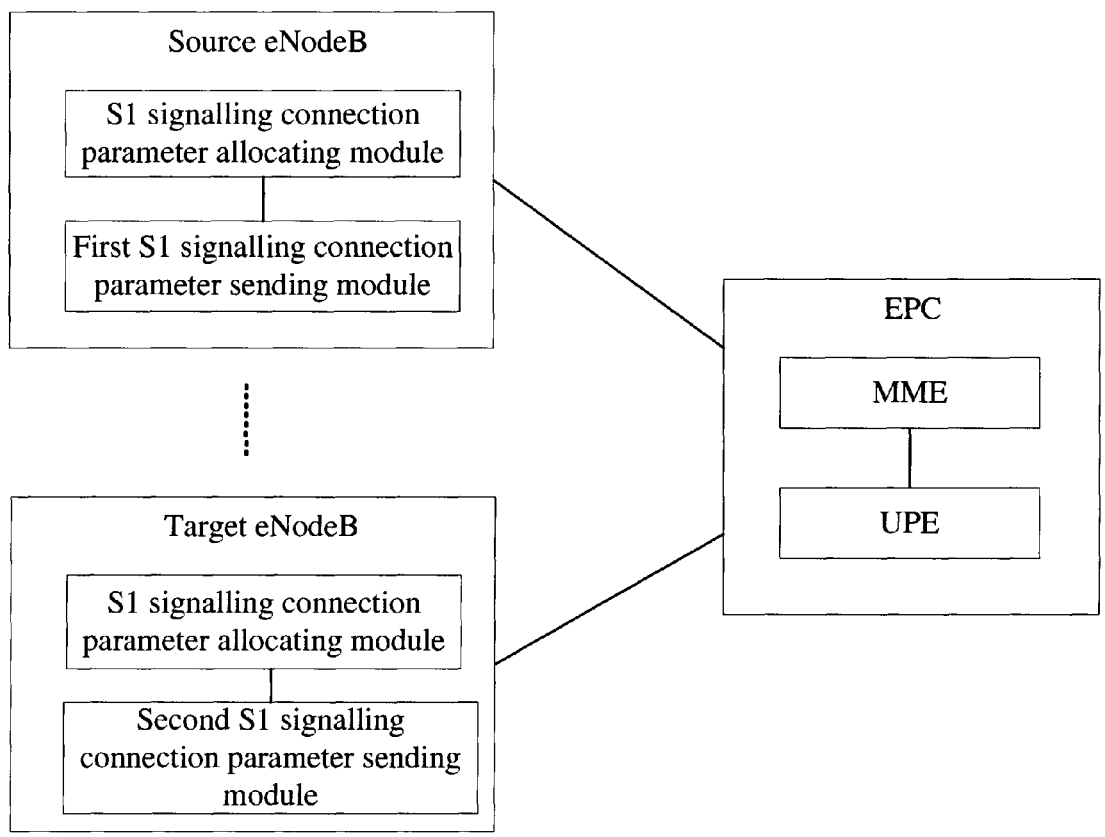
FIG. 10 shows the system structure in an embodiment of the present disclosure.

Another embodiment of the disclosure provides a system for establishing S1 signaling connections in an evolved network. As shown in FIG. 10, the system includes at least two eNodeBs.

When acting as a source eNodeB for handover of a UE, an eNodeB includes:

an S1 signaling connection parameter allocating module, adapted to allocate an S1 signaling connection parameter of the eNodeB and an EPC to the UE, where the signaling connection parameter is an S1 signaling connection ID or an MME/eNodeB communication context identifier;

a first S1 signaling connection parameter sending module, adapted to send an original S1 signaling connection parameter to a target eNodeB, that is, to send the S1 signaling connection parameter of the source eNodeB and the EPC allocated to the UE by the S1 signaling connection parameter allocating module to the target eNodeB, where the S1 signaling connection parameter may be a PPI field in the SCTP header and included in S1 signaling connection identifier information and carried in a HANDOVER REQUEST message for transmission; the S1 signaling connection identifier information may optionally include an SCTP association ID and an SCTP stream ID; or the S1 signaling connection parameter may be an MME connection context identifier and an eNodeB communication context identifier.

When acting as a target eNodeB for handover of a UE, the eNodeB includes:

an S1 signaling connection parameter allocating module, adapted to allocate an S1 signaling connection parameter of the eNodeB and the EPC to the UE;

a second module for sending S1 signaling connection identifier information that is adapted to send the original S1 signaling connection parameter of the source eNodeB and the EPC and the S1 signaling connection parameter of the target eNodeB and the EPC, that is, to send the original S1 signaling connection parameter and the new S1 signaling connection parameter, where the signaling connection identifier information may be carried in a HANDOVER COMPLETE message for transmission.

In the foregoing embodiment of the disclosure, the system may further include an EPC, which is adapted to update a route according to the information sent by the second module for sending S1 signaling connection identifier information, and store the S1 signaling connection parameter of the target eNodeB and the EPC. The EPC may search for the original communication instance according to the original S1 signaling connection parameter. The EPC further includes an MME and a UPE. The MME stores the S1 signaling connection parameter of the target eNodeB and the EPC, and searches for the original communication instance according to the original S1 signaling connection parameter; when the S1 signaling connection parameter is MME communication context identifier and eNodeB communication context identifier, the MME is further adapted to allocate a new MME communication context identifier. The UPE updates the route after the handover is complete.

To sum up, in the embodiments of the disclosure, an S1 signaling connection ID or a communication context identifier is added in messages during a handover process, so that the target eNodeB is able to establish an S1 signaling connection with the EPC according to the identifier. This solves the inability of the target eNodeB to establish a connection with the EPC after the UE is handed over in the related art.

The above are only exemplary embodiments of the present disclosure, and are not intended to limit the scope of protection of the disclosure. It is apparent that those skilled in the art can make various modifications and variations to the disclosed embodiments without departing from the spirit and scope of the disclosure. The disclosure is intended to cover the modifications and variations provided that they fall in the scope of protection defined by the claims or their equivalents.

What is claimed is:

1. A method for establishing S1 signaling connections in an evolved network, comprising:
   receiving, by an evolved packet core (EPC), a HANDOVER COMPLETE message that carries a new S1 signaling connection parameter and an original S1 signaling connection parameter;
   storing, by the EPC, the new S1 signaling connection parameter in the HANDOVER COMPLETE message; and
   searching for, by the EPC, an original communication instance according to the original S1 signaling connection parameter after receiving the HANDOVER COMPLETE message that carries the new S1 signaling connection parameter and the original S1 signaling connection parameter.

2. The method of claim 1, wherein the HANDOVER COMPLETE message is received by a mobility management entity (MME) in the EPC, the method further comprising:
   sending, by the MME, a REROUTE REQUEST message to a user plane entity (UPE) in the EPC; and
   receiving, by the MME, a REROUTE RESPONSE message from the UPE, the REROUTE RESPONSE message indicating a completion of a user plane route update.

3. The method of claim 1,
   wherein the HANDOVER COMPLETE message is received by a user plane entity (UPE) in the EPC, the method further comprising:
   sending, by the UPE, a ROUTE UPDATE REQUEST message to a MME in the EPC to notify the MME that a user plane route is updated, the ROUTE UPDATE REQUEST message including the original S1 signaling connection parameter and the new S1 signaling connection parameter; and
   receiving, by the UPE, a ROUTE UPDATE RESPONSE message sent from the MME after receiving the ROUTE UPDATE REQUEST message.

4. The method of claim 1, further comprising:
   allocating, by a MME in the EPC, a new MME communication context identifier; and
   sending, by the MME, a HANDOVER COMPLETE ACK message that carries the new MME communication context identifier to the target eNodeB.

5. The method of claim 1, wherein the new S1 signaling connection parameter includes new S1 signaling connection identifier information or communication context identifier information.

6. The method of claim 1, wherein the original S1 signaling connection parameter includes identifier information of the original S1 signaling connection or communication context identifier information.

7. A system for establishing S1 signaling connections in an evolved network, comprising:
   a source eNodeB;
   a target eNodeB; and
   an evolved packet core (EPC), including
      a mobility management entity (MME); and
      a user plane entity (UPE),
   wherein the source eNodeB comprises:
      a first S1 signaling connection parameter sending module adapted to send an original S1 signaling connection parameter to the target eNodeB,
   wherein the target eNodeB comprises:
      an S1 signaling connection parameter allocating module adapted to allocate a new S1 signaling connection parameter to a user equipment (UE); and
      a second sending module adapted to send the original S1 signaling connection parameter and the new S1 signaling connection parameter to the EPC,
   wherein the MME is adapted to store the new S1 signaling connection parameter and search for an original communication instance according to the original S1 signaling connection parameter, and
   wherein the UPE is adapted to update a route after completion of a handover.

8. The system of claim 7, wherein the MME is further adapted to allocate a new MME communication context identifier and send the new MME communication context identifier to the target eNodeB.

9. The system of claim 7, wherein the new S1 signaling connection parameter is configured to include new S1 signaling connection identifier information or communication context identifier information.

10. The system of claim 7, wherein the original S1 signaling connection parameter is configured to include identifier information of the original S1 signaling connection or communication context identifier information.

* * * * *